Feb. 27, 1934.  E. RIEMENSCHNEIDER  1,948,801
METHOD AND APPARATUS FOR WELDING
Filed July 14, 1933  4 Sheets-Sheet 1

INVENTOR
ERNEST RIEMENSCHNEIDER
BY
ATTORNEY

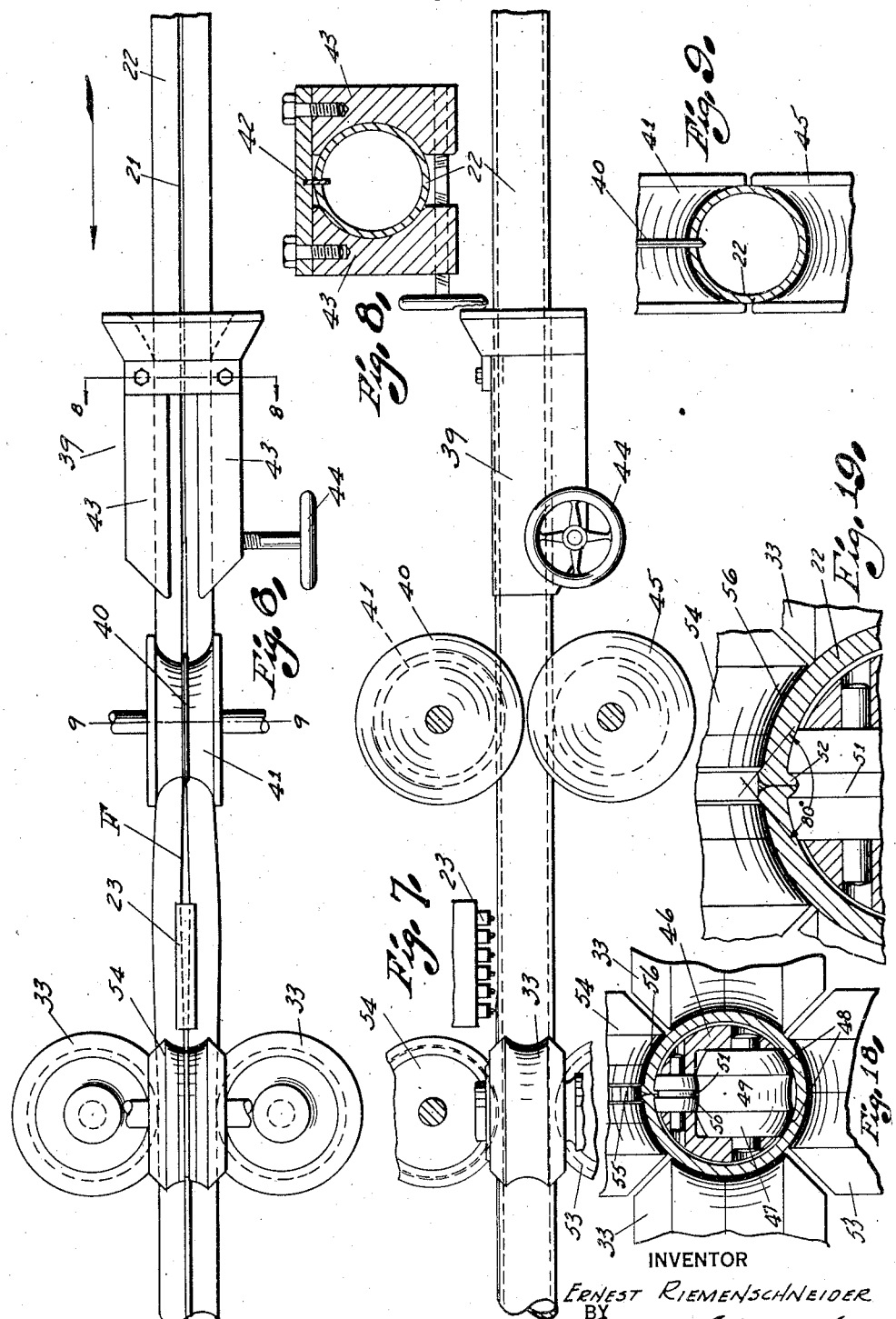

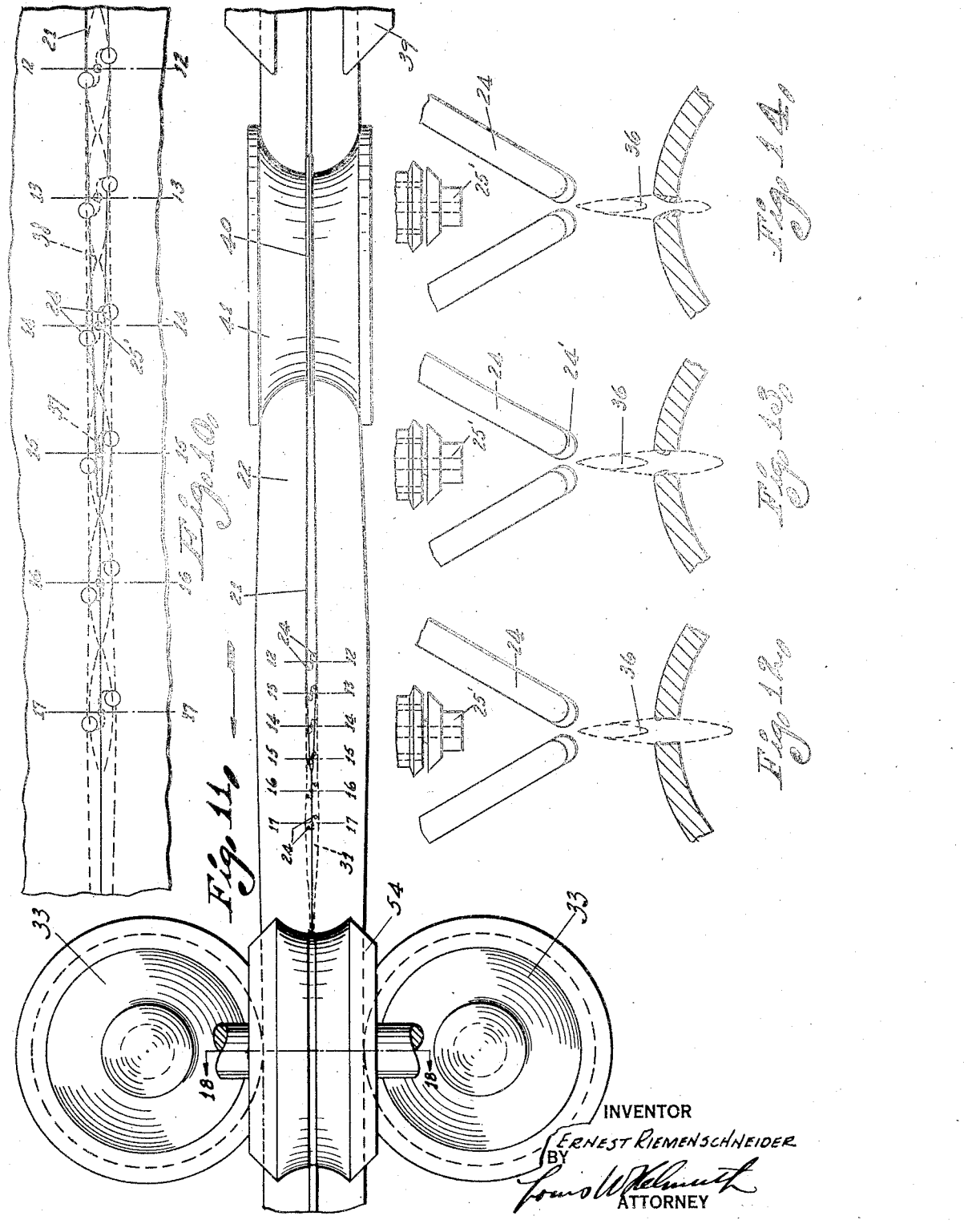

Feb. 27, 1934.  E. RIEMENSCHNEIDER  1,948,801
METHOD AND APPARATUS FOR WELDING
Filed July 14, 1933  4 Sheets-Sheet 4

INVENTOR
ERNEST RIEMENSCHNEIDER
BY
ATTORNEY

Patented Feb. 27, 1934

1,948,801

UNITED STATES PATENT OFFICE 1,948,801

METHOD AND APPARATUS FOR WELDING

Ernest Riemenschneider, Cleveland, Ohio, assignor to Midland Steel Products Company, Cleveland, Ohio, a corporation of Ohio Application July 14, 1933. Serial No. 680,481

13 Claims. (Cl. 219—10)

This application is a continuation in part of my co-pending application Serial No. 475,948 filed August 18, 1930.

This copending application contemplated as one of its objects, the utilization of heat remaining in the hot strip as it issued from the rolling mill and illustrated specifically therein the use of a plurality of heating units lengthwise of an open seam cleft to be welded for more rapidly melting portions of the edges forming the open seam cleft to a liquid stage and the present application is filed to cover this last mentioned phase of the former application.

An important object of the invention is to provide a method and apparatus whereby metal in the liquid stage is formed from the parent metal of spaced apart edges forming an open seam cleft while the stock is being moved through a heating zone capable of imparting sufficient heat to the stock to progressively increase quantities of liquid metal upon the spaced apart edges sufficient to form a pool or puddle of liquid metal for a substantial part of the thickness of the stock as the edges of the cleft are moved toward each other to cause union of the liquid metal of the two spaced apart edges. Preferably, the spaced apart edges are melted sufficiently to cover substantially the entire vertical surfaces of the edges with liquid metal, an instant or so before the edges are moved toward one another to cause the liquid metal of the two edges to run together and join; it being obvious that the spaced edges of the cleft need not be actually melted for their full depth, but only for such depth that so much of the liquid metal created, will creep over the exposed edges as will be necessary to achieve substantially complete penetration rapidly enough to satisfy the demands of commercial speed.

Another object of the invention is to maintain liquid metal in the cleft in the form of a bridge or pool prior to the edges being brought to their final welding position, whereby all gases, slag and other impurities have ample opportunity to work out or be worked out of the metal constituting the joint.

A further object of the invention is to form liquid metal on the edges in the form of a suspension bridge of liquid metal between the edges, and to retain the same in this form by the surface tension of the liquid, or, in other words, without providing a positive support therebeneath. This is accomplished by corelating the velocity of the gas, the heat, the speed of travel of the stock and the movement of the edges toward one another as hereinafter described.

Another important object of the invention is to provide positive means for opening the cleft uniformly as it enters the heating zone and causing it to begin its closing movement substantially as soon as it enters the heating zone so that the heat can rapidly penetrate the full depth of the edges and the lower portions of the edges will be brought together or substantially together at the proper time.

A further important object of the invention is to co-relate the heat, speed of travel of the stock and the opening and closing of the seam to accomplish the foregoing objects.

Other objects and advantages of the invention will become apparent during the course of the following description.

In the accompanying drawings forming a part of the application and wherein like numerals are employed to designate like parts throughout the several views, Fig. 1 is a longitudinal sectional view of a tube-form illustrating the formation and welding of a portion of the same.

Fig. 6 is a top plan of the apparatus for opening the cleft in the tube-form and the means for closing the cleft during the welding operation.

Fig. 7 is a side elevation of the same.

Fig. 8 is an enlarged transverse section taken on the line 8—8 of Fig. 6.

Fig. 9 is a partial transverse section taken on the line 9—9 of Fig. 6.

Fig. 10 is an enlarged top plan illustrating the condition of the cleft during the passage through the heating zone with the electrodes and hydrogen jets of the atomic hydrogen unit illustrated in their relative position thereto.

Fig. 11 is a top plan of the tube-form and apparatus illustrating the relative position of the parts.

Figs. 12 to 17 inclusive are enlarged transverse sections through the cleft illustrating the condition of the edges as it passes successively beneath each heating unit, the sections being taken respectively on the section lines of Figs. 10 and 11.

Fig. 18 is a transverse section taken on the lines 18—18 of Fig. 11.

Figure 20:
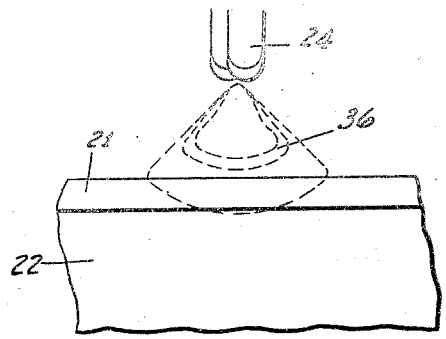

Fig. 19 is a transverse section taken on an enlarged scale showing, one form of a complete weld, and Fig. 20 is a longitudinal section of a tube showing the operation of an atomic hydrogen unit on an open seam cleft.

Figure 1:
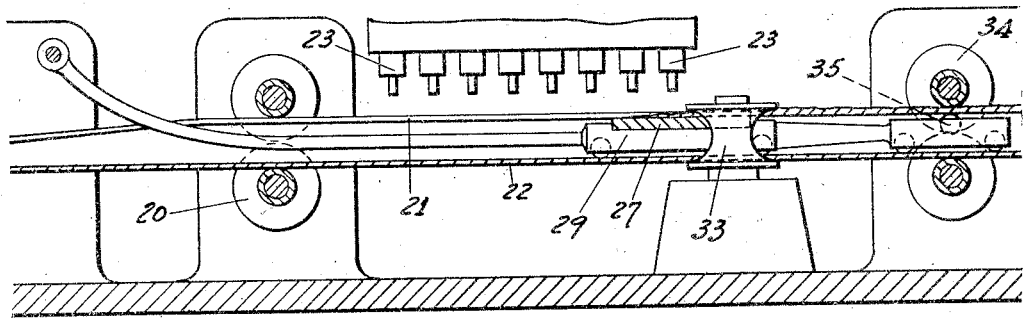
Figure 2:
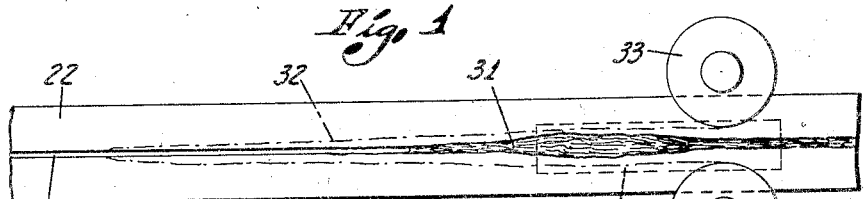
Fig. 2 is a top plan of a tube form diagrammatically illustrating the various steps of the welding operation.
Figure 3:
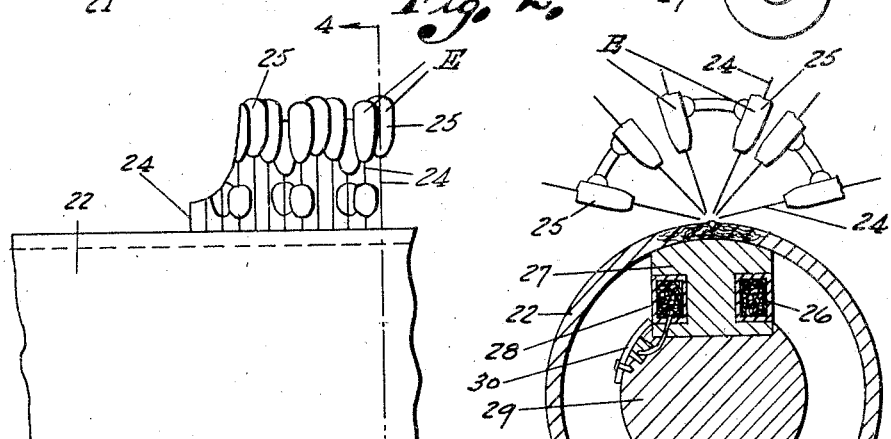
Fig. 3 is an illustration of the use of atomic hydrogen arcs for raising the edges to be welded to a welding temperature.
Figure 4:
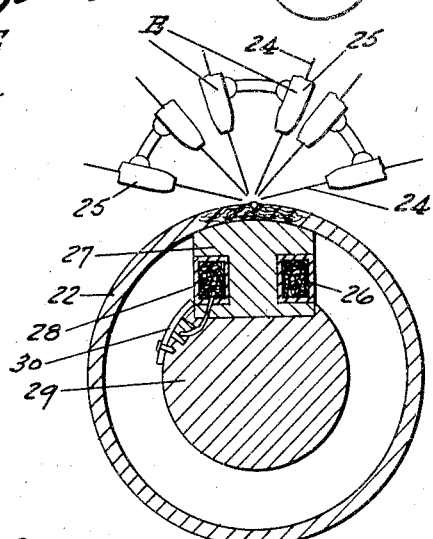
Fig. 4 is a sectional view taken on a plane indicated by the line 4—4 of Fig. 3.

Fig. 1 corresponding to Fig. 10 of my application Serial No. 475,948 illustrates at 20 the final pass or rolls of a tube forming mill which forms flat strip stock into tube form with the two longitudinal edges of the strip stock in spaced apart juxtaposed relation to form an open seam cleft 21. This tube mill continuously feeds the tube-form stock or tubing with the open seam cleft uppermost beneath an elongated heating zone constituted by a series of heat sources 23 arranged in a battery or series successively lengthwise of the tubing and open seam cleft to bring the spaced apart edges to a welding state. The atomic hydrogen arc apparatus which is illustrated is generally of the type in which the electrodes of each pair are adjustably mounted in heat resistant conductors 24 also arranged in pairs as illustrated. The arcs created between the ends of the electrodes, in this type of apparatus are kept constantly in a bath of hydrogen forced from nozzles in holders 25 preferably at relatively low-velocity. This produces a very intense heat and likewise protects the hot metal stock from oxidation. Another advantage of using atomic arcs resides in the fact that the conductors may be placed more closely together than the carbon electrodes of tornado arc units. Furthermore, the necessity of grounding the stock is eliminated.

To assist in holding the arcs in the desired position relative to the stock and otherwise rendering welding more efficient, I may provide a magnet 26 on the opposite side of the stock from the arcs. A convenient magnet may be formed as illustrated by winding a coil of insulated wire about a shoe 27, the coil being protected from the heat by suitable installation 28. A channel or passage is provided in a shoe supporting mandrel 29 to accommodate the lead wires to the coil. The passage in the mandrel may be closed by a suitable plate 30. The diagrammatic illustration of placing the atomic arc units is illustrative of only one manner in which a given number of units may be placed within a comparatively short distance longitudinally of the tubing.

Figure 5:
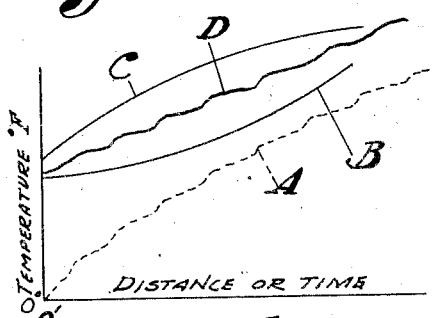
Fig. 5 is an exemplary graph showing the ratio between time or speed and temperatures.

In Fig. 5 are exemplary graphs showing the ratio between the time and temperature used in my process, the curve A illustrating for comparison one of the combinations of time and temperatures obtained by the process of my co-pending application Serial No. 473,484 filed August 6, 1930, now Letters Patent No. 1,810,112. The curve B illustrates that the stock may enter the welding apparatus at a temperature somewhat above that described in my copending application and is then rapidly brought up to the welding temperature. In curve C the strip enters at about the same temperature as the curve B and is heated rapidly to within a few degrees of welding temperature and then more gradually brought up to the desired temperature. Curve D illustrates the manner of heating in which the temperature of the stock is raised in steps from the heat at entrance to welding temperature. Obviously, many other possible combinations of time, or speed and temperatures are obtainable with the use of my process and apparatus, and I find that the welding can be very efficiently conducted with stock entering the apparatus at room temperature. Each atomic hydrogen unit is independently regulatable so that its temperature may be increased or decreased at will so that any desired voltage for each arc and any desired pressure of hydrogen gas may be obtained. By varying voltage of the arc or the velocity of the pressure of the hydrogen gas, the extent of the arc and the amount of atomic hydrogen gas blown through the arc can be varied as desired.

As the tubing moves under the successive sources of heat, the temperature is gradually raised until a long, narrow molten pool of metal is formed as indicated by the numeral 31 and limited portions of the tubing adjacent the seam cleft are raised in temperature as indicated by the wavy lines 32. While in this condition the tube passes between welding throat rolls such as 33, which force the edges of the seam cleft relatively toward each other to form the weld. It will of course be obvious that the edges of the open seam cleft begin moving toward each other considerably in advance of the side pressure rolls 33 and before the edges reach the shoe 27. As the tube continues movement along its path, it may be engaged by seam smoothing rollers 34 which roll down the weld and bring it to the contour of the finished tube, or the metal extruded by the side pressure rolls 33 may be removed in any suitable manner. If the seam is rolled down, the underside of the welded seam is held firmly against a small inside roller 35 which may be carried by the mandrel 29 as illustrated.

By referring to Figures 3, 4 and 10 to 17 inclusive, it will be noted that the electrodes are arranged in pairs with the members of each pair disposed generally at opposite sides of the seam cleft. Moreover, the members of each pair are offset longitudinally of the cleft so that a vertical plane extending through each pair is diagonal to a vertical plane extending through the seam cleft. This longitudinal offsetting of the electrodes is particularly shown in Figure 10, wherein it will be observed that the lines 14—14, 15—15 etc. extend between the members of each pair of electrodes. It will also be noted that the holders 25 of this central unit direct the low-velocity hydrogen gas along the electrodes 24 to project it through and about the arcs created between the electrodes and directly down between the edges of the tubing forming the open seam cleft. It will also be noted from Fig. 1 corresponding to Fig. 10 of the parent application that the first six atomic hydrogen units 23 are disposed directly above the open seam cleft so as to project the gas at low-velocity directly through the cleft. Offsetting of the electrodes of each pair as illustrated, causes an arc 37 struck therebetween to be disposed substantially in a plane, normal to a plane including both electrodes, which is, in this arrangement, lengthwise of the open seam cleft. The arcs and atomic hydrogen coronas are diagrammatically illustrated in Figs. 12 to 17 by the numeral 36. By reason of the fact that there is no obstruction such as abutting edges of stock being placed in the path of the arc or gas stream therefrom the fan shaped atomic flames are projected directly into the cleft and have free unobstructed passage through the open seam cleft to be concentrated between the spaced edges. This is extremely important as the edges defining the open seam cleft prevent the greater part of the atomic gas from spreading transversely of the pipe to any material extent thereby inducing the atomic hydrogen flame to spread out lengthwise of the open seam cleft to cover more area and concentrate heat upon the exposed edges for rapidly reducing them to a uniform liquid condition.

Figure 15:
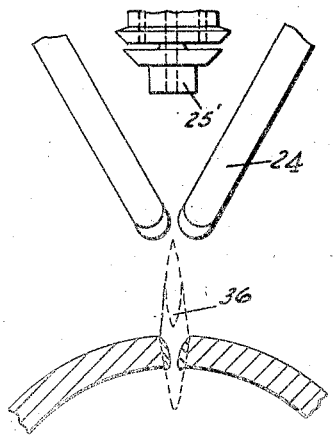
Figure 16:
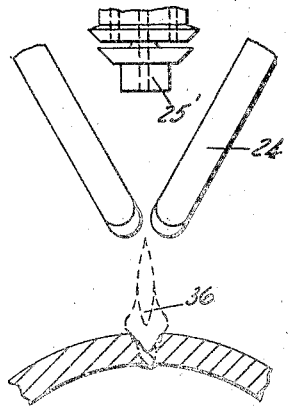
Figure 17:
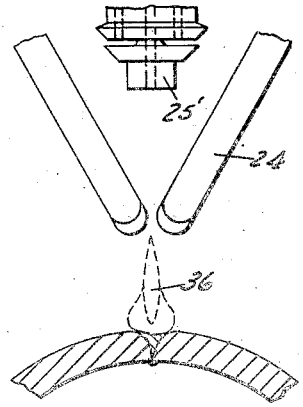

In Figs. 1, 2, and 10 to 17 inclusive, the progressive melting of the edges of the cleft so as to provide actual liquid metal on the edges retained by surface tension, is illustrated. As the tube-form stock passes under the first atomic hydrogen unit 23, the upper corners of the open seam cleft are melted to liquid condition as shown in Fig. 12. As the tubing passes under the second arc, still more liquid metal is formed upon the spaced apart edges as shown in Fig. 13. As the tubing moves farther along progressively under the third and fourth unit, more and more liquid metal is formed upon the spaced apart edges as shown in Figs. 14 and 15. Substantially uniform quantities of liquid metal are created upon the spaced edges since there is little or no tendency for the units, due to the low-velocity of the gas, to blow the liquid metal off of the spaced edges. The inherent tendency of the liquid metal to cling to its parent stock, or in other words, surface tension, precludes the liquid metal from dropping off the spaced apart edges. As the tubing is passing under the third, fourth, fifth and sixth heating units, the spaced apart edges of the cleft are being progressively moved closer and closer toward each other so that under about the fourth unit, the edges of the open cleft having films or quantities of liquid metal thereon for a good part of the entire depth thereof or for substantially or completely their full depth, are moved further toward each other by the side pressure rolls 33 so that the films of liquid metal on the spaced apart edges touch and run together to form a bridge or the beginning of the trailing end of the pool 31 of liquid metal. The lower portions of the edges of the cleft underlying the actual liquid metal are not at this point, that is under the fifth unit, in actual abutting relationship but there is still a small space between the more pasty portions of the two edges. In spite of this, due to the inherent tendencies of the bridge or liquid metal to hang on and cling to the less liquid portions of the edges, it is precluded from falling through the bottom of the cleft irrespective of what spacing (within certain limits) of the more pasty portions of the edges actually exists at this stage of the process. In other words, by this process, I may use the inherent tendency of the metal to hand on to and cling to the edges and thereby eliminate the necessity for a support or shoe beneath the liquid metal. This is accomplished by suitably corelating the edge spacing, the speed of travel of the stock, the velocity of the gas, and the heat. These more pasty portions of the edges of the cleft may be still slightly spaced apart as the tubing passes the sixth heating unit or they may be caused to just barely touch or slightly upset under the fifth and sixth unit depending upon the gauge of the tubing, the heat created in the heating zone, the speed of travel of the tubing, or the time when the edges of the open cleft begin approaching one another. This latter factor is controlled by the extent of the open cleft and the variable relationship between the heating zone and side pressure rolls. It is to be understood that the invention is not to be restricted to the position where the liquid metal from the two edges is caused to run together with reference to the heating zone or any particular unit as this may be varied according to the gauge of the stock and the factors of time, speed and temperature. In any event, where the liquid metal of the two edges is caused to unite forming the trailing end of the liquid pool, the liquid metal of this pool, due to the movement of the tubing is caused to shift longitudinally of the tubing due to its being temporarily carried along with the stock and then permitted to drift back rearwardly of the seam as the surface tension is interrupted at rather regularly occuring intervals so that is the reason why it is stated that the liquid metal of the two edges begins to run together in the vicinity of certain of the units. This pool is relatively long because it is preferably caused to exist from a point in the vicinity of the fourth unit to a point considerably beyond the 6th unit and toward the side pressure rolls. As a result, the playing of the atomic hydrogen flames on the surface of this liquid pool has a tendency to cause the top of the pool to widen out and to be wider than the bottom of the pool but this widening at this point is somewhat counteracted by the movement of the edges of the pool closer together under the influence of the side pressure rolls. With the atomic hydrogen flames playing down upon the pool at this point, the surface of the pool is depressed lengthwise and the metal under this surface metal and down through the full thickness of metal in the cleft is heated by conduction rather than by convection. Whether this pool under the 5th and 6th heating unit is fully liquid metal throughout its entire depth or whether the metal of the pool is liquid near the top and is of progressively diminishing liquidity toward its bottom or whether the bottom is merely in a state of semi-molten metal, semi-plastic, fully plastic or tacky metal depends upon how far together the edges have been moved. Likewise, considering the character of the metal from the center of the pool outwardly toward the sides of the tubing, it is believed that the state of the metal progressively varies metallurgically outwardly from the center of the seam from a state of actual liquidity through all of the intermediate stages to gradually blend into the solid metal of the tubing itself.

The retention of the liquid metal in the seam cleft in the form of a rather long pool permits the liquid metal to get rid of all included gases, slag and other foreign materials and this action is augmented by the width of the body of liquid metal down within the seam being decreased as it approaches the side pressure rolls. As this body of gradually solidifying metal begins to enter between the side pressure rolls 33, the width of the cleft is further reduced to squeeze out practically all of the liquid metal and raise it on top of the tube in the form of a bead which may be subsequently removed or rolled down in any suitable manner. Any amount of upsetting of the pasty edges of the seam may be accomplished by varying the adjustment of the side pressure rolls 33, and in Figs. 18 and 19, a considerable upset of the pasty edges is illustrated with a thin film or ribbon of liquid metal solidified between the edges which assures a most perfect weld.

As shown in Figs. 12 to 17 inclusive, the form of atomic hydrogen unit shown in my co-pending application Serial No. 544,456, filed June 15th, 1931, is illustrated as possessing a central hydrogen jet 25' and reference to this co-pending application will give the detailed construction and operation of the welding head. It will be understood that the entire group or series of electrodes will be enveloped by burning hydrogen to form a non-oxidizing atmosphere enveloping the entire welding zone and edges being welded both inside and outside of the tubing. With an open seam cleft the burning hydrogen gas is projected into the inside of the tubing and burned therein for a distance of approximately three feet on either side of the heating unit to form a non-oxidizing atmosphere on the inside of the welded joint as well as to provide a baffle which assists in preventing objectionable drafts through the tubing during the welding operation from adversely affecting the stability of the arcs and flames. In addition to this the burning hydrogen gas within the tubing licks up through the open seam cleft for a distance of approximately three feet in advance of the heating unit and effects pre-heating of these edges. Important, also is the fact that the electrodes are arranged at a predetermined fixed distance from the tubing so that the arc is, for certain gauges of stock, disposed about $\tfrac{1}{16}$ of an inch from the top of the tube and the spaced apart edges forming the open seam cleft so that the atomic hydrogen impinges and is concentrated directly against the exposed edges for the full thickness thereof.

In order to assure presentation of a substantially uniform open seam cleft to the series of atomic hydrogen units, attention is invited to Figs. 6 to 9 inclusive wherein the tube-form stock moves from right to left through a throat 39 which compresses the tube-form under tension and moves the edges of the open seam toward each other to cause them to fulcrum on a circumferential rib 40 of a roll 41, thereby causing controlled separation of the edges of the open seam cleft at substantially point F where the edges are first presented to the heating unit. This very thoroughly opens the cleft uniformly with the edges substantially parallel for the free passage of the flames and exposes the edges of the cleft to the most intense heating portions of the atomic hydrogen flame so that the edges can be rapidly melted to equal degrees to a liquid condition and liquid metal or films of liquid metal rapidly created upon the substantially vertical edges of the cleft throughout substantially their entire depth. Incidentally, the side pressure roll 33 cause the liquid edges to merge into one another which, of course, means slight constriction of tube diameter and a virtual crossing of the edges with the result that the unwelded edges rearwardly from this virtual crossing point diverge rearwardly and toward the entrance to the heating zone and are controlled by the roll 41 and throat 39 so as to meet at a predetermined point under or in proximity to the heating unit. This throat 39 has its tapered receiving end formed with a circular opening through which the tubing slides freely and this end is provided with a rib 42 which traverses the open seam cleft 21 and prevents any turning or twisting tendencies of the tubing upon its axis and may be arranged to scrape or file the edges. The discharge end of the throat comprises a pair of adjustable side shoes 43 which are movable toward and away from each other by means of the adjusting screw and handle 44. These shoes engage opposite sides of the tubing on opposite sides of the open seam cleft and are adjusted so that they compress the tubing circumferentially and move the edges of the open seam cleft toward each other to cause them to fulcrum on the rib 40 of roller 41. The inside surfaces of these two shoes of course closely conform to the contour of the tubing and are elongated to exert the requisite side pressure on the tubing for the purposes set forth. From the foregoing it will be apparent that as the edges of the stock become liquid and the side pressure rolls 33 exert inward pressure upon the tubing, these liquid edges will be forced together thereby constricting the tubing and causing in effect a crossing of the edges so that they diverge toward the heat source 23 and open up for the penetration of heat. This opening or separating movement of the edges is controlled to a fine degree by the spreader roll 41 and confining throat 39 which cooperation causes a predetermined separation of the edges of the stock as they enter the heating zone. Any desired degree of uniform spacing of these edges may be achieved by varying the relationship of the pressure jaws 43 by means of the screw 44.

Beneath the ribbed roll 41 is a tube engaging roll 45 which has its axis in the same vertical plane with that of the ribbed roll 41. Fig. 11 better illustrates, on a larger scale, the effect of the seam opening mechanism and it will be noted that the edges of the open seam cleft slightly converge inwardly of the tubing when substantially square edge flat strip stock is employed for the manufacture of the tubing and is formed into tube form thereby causing the square edges to adopt somewhat the chamfered relationship shown in Fig. 12. In the present illustration it will be noted that the spaced apart edges of the cleft begin to move toward each other under the influence of the side pressure rolls 33 after passing the first arc.

To maintain the finished tubing true to size and exert the requisite pressures in the proper directions to attain the desired welding and upsetting, with the edges maintained juxtaposed, a mandrel or support may be used in the tubing rearwardly of the heat sources 23 and at a point between the side pressure rolls 33. This support carries a roller 47 which has outwardly tapering peripheral portions 48 to conform to the inside finished contour of the tubing with an intermediate peripheral groove 49. Engaged with this groove and conforming to the contour thereof is a smaller roller 50 which has a central groove 51 adapted to receive the amount of upset 52 provided on the inside of the welded seam. A roll 53 engages the underside of the tubing between side pressure rolls and a similar roll 54 is provided to engage the upper surface of the tubing. This upper roll has an intermediate peripheral groove 55, the bottom of which is adapted to contact with the extruded bead of the seam and roll it down to any desired degree and shape. The surfaces 56 of this upper roll are angled to conform to the finished exterior circumference of the tubing and are related to the smaller roller to move the walls of the tubing in a true arc toward each other to complete the weld. If desired the roll 54 may be divided vertically so as to constitute two separate rolls engaging the tubing on opposite sides of the seam to keep the edges of the tubing moving in a perfect arc while being moved toward one another to form the weld.

As the edges are moved toward one another from the influence of the side pressure rolls 33, the liquid metal in the elongated pool is squeezed up between the edges as the tubing passes between the rolls and causes extrusion of a bead of metal on top of the tubing. This bead may be left on the tubing, removed or rolled down flush with the exterior contour, depending upon the use to which the tubing is to be subjected. The extent to which the edges are moved can be varied so that any desired amount of liquid metal can be left in the cleft to solidify and complete the weld, but for most purposes, it is believed desirable to move the edges together until only a very thin ribbon or film or liquid metal is left between the edges to subsequently solidify and constitute the actual welded joint.

Looking toward greater arc stability, attention is called to the fact that the edges of the seam cleft are presented to the heating zone in spaced apart relationship. This spacing of the edges provides a gap in the metal and causes magnetic lines of force in the tubing to extend parallel to the open seam cleft. This may be augmented by the use of the coil 26 to establish greater magnetism in lines of force in the tubing lengthwise and parallel to the seam cleft in order to induce stabilization of the arc also lengthwise and in alignment with the cleft. Other means of inducing greater lines of magnetism in the stock may be provided but only one form is here shown for the purposes of illustrating the principle involved.

It will be understood that various factors in the method and apparatus may be altered as indicated in the specification and the claims are to be construed accordingly. It will also be apparent that gases other than hydrogen may be used as well as combinations of these gases with hydrogen in varying quantities.

I claim:

1. A process for welding metal members together which consists in moving the members along a given path with the edges thereof spaced apart to form an open seam cleft, melting the spaced apart edges to liquid condition during said movement, moving the edges toward each other to cause the liquid metal of the edges to run together and form a bridge of liquid metal joining said edges, and maintaining the liquid bridge in position by the surface tension of the liquid and its tendency to cling to the stock independently of other support by suitably corelating the speed of travel, edge spacing, and melting medium.

2. A process for welding to tube-form which consists in moving unwelded tube-form stock along a given path with the edges thereof in spaced relation to form an open seam cleft, melting the edges during said movement by projecting low-velocity gas directly into the open seam cleft to form liquid metal on the spaced apart edges, and moving the edges toward one another while continuing the application of heat to form a body of liquid metal bridging the edges and retaining the liquid body in position by corelating the gas velocity, heat, edge movement, and speed of travel of the stock independently of external support.

3. A process for welding to tube-form which consists in moving unwelded tube-form stock along a given path with the edges thereof in spaced relation to form an open seam cleft, melting the edges during said movement by projecting low velocity gas directly into the open seam cleft without blowing liquid metal therethrough to form liquid metal on said spaced apart edges, and moving the edges toward one another until the lower portions thereof substantially abut while continuing the application of heat thereby causing the liquid metal of the edges to run together without dripping to form a body of liquid metal between the edges to subsequently solidify and form the weld.

4. A process for welding metal members together which consists in feeding members along a given path with the edges thereof in juxtaposed spaced relation to form an open seam cleft, forming electrically independently of said members a plurality of electric arcs, directing into the open cleft and through each arc a stream of low velocity gas to thereby form a narrow intense heating zone lengthwise of and down between the spaced edges forming the cleft for the entire depth thereof to create liquid metal upon the spaced apart edges while the members are being moved longitudinally relatively to said zone, and moving the edges relatively toward each other to reduce the width of the cleft and to cause the liquid metal of the two edges to run together.

5. A process for welding to tube-form which consists in feeding unwelded tube form stock along a given path with the edges of the stock in spaced apart juxtaposed relation to form an open seam cleft, forming electrically independently of said members a plurality of electric arcs at points successively disposed along the path of travel of the stock, directing a stream of low velocity gas having a substantial hydrogen content through each arc and into the cleft to break the force of the stream and create an intense low pressure heating zone lengthwise of and down between the traveling edges defining the open seam cleft to melt exposed surfaces of the edges and add successively increasing quantities of liquid metal to said spaced apart edges, while coordinating the heat and speed of travel of the stock to prevent dripping, and moving the edges toward one another in coordination with the heat and speed to cause the liquid metal of the edges to run together to form a body of liquid metal substantially filling the cleft.

6. In welding apparatus, means for moving metal members to be welded along a given path with their edges in spaced apart juxtaposed relation to form an open seam cleft, means for directing a narrow stream of atomic gas directly between the spaced apart edges forming the cleft and freely through the cleft whereby the intense heat from the gas acts directly upon the exposed vertical edges of the open cleft throughout substantially the entire depth thereof to create liquid metal on said edges, and means for moving the edges toward each other to cause the liquid metal of the edges to join and form a body of liquid metal.

7. In an apparatus for welding tube-form stock, means for moving the stock along a given path with the edges thereof to be welded in spaced apart juxtaposed relation to form an open seam cleft, means disposed above the cleft and including a pair of converging electrodes having arcing terminals arranged in a plane generally transverse to the length of the edges to create an arc between said terminals, means for flowing a stream of low velocity gas across and about said arcing terminals to create an area of intense heat extending down between the exposed vertical edges forming the open cleft throughout substantially their entire depth to create liquid metal on the edges, and means for moving the edges together to cause the liquid metal of the edges to join and form a pool of liquid metal bridging the edges.

8. In an apparatus for welding tube-form stock, means for moving the stock along a given path with the edges thereof to be welded in spaced apart juxtaposed relation to form an open seam cleft, a plurality of arc creating devices independent of the stock arranged above said seam cleft, means for directing a stream of gas having a substantial hydrogen content through each arc and down between the spaced apart edges forming the seam cleft and into the tube-form stock whereby an elongated zone of atomic hydrogen is formed in the open seam cleft between the walls thereof to impart its heat to the exposed vertical edges of the cleft throughout substantially their entire depth for creating liquid metal upon said spaced apart edges, and means for moving the edges toward each other to cause the liquid metal of the edges to join and form an elongated narrow pool of liquid metal between said edges.

9. In welding apparatus for welding tube-form stock while it is moving along a given path with the edges of the stock juxtaposed to form a cleft, spreader means operating in said cleft, tube compressing means engaging the tube-form stock on one side of said spreading means, a heating medium on the opposite side of the spreading means, and said compressing means causing the cleft to open a predetermined distance as it moves beneath the heating means to expose the edges of the cleft thereto.

10. In welding apparatus for welding tube-form stock as it moves along a given path with the edges juxtaposed to form a cleft, a heat source for melting said edges, tube compressing means for moving the edges together as they are melted, means disposed between the edges in advance of the heat source, and means cooperating with said last mentioned means and in advance thereof for controlling the separating movement of said edges for maintaining a predetermined uniform edge spacing as the stock moves under the heat source and to cause the edges to move together at a predetermined point adjacent the heat source.

11. In welding apparatus for welding tube-form stock as it moves along a given path with the edges juxtaposed to form a cleft, a heat source for melting said edges, tube compressing means for moving the edges together as they are melted, means disposed between the edges in advance of the heat source, and transverse pressure applying means cooperating with said last mentioned means and in advance thereof for controlling the separating movement of said edges for maintaining a predetermined uniform edge spacing as the stock moves under the heat source and to cause the edges to move together at a predetermined point adjacent the heat source.

12. In welding apparatus for welding tube-form stock as it moves along a given path with the edges juxtaposed to form a cleft, a heat source for melting the edges, tube compressing means for moving the edges together as they are melted, thereby causing said melted edges to merge into each other at one point, and means disposed in advance of the heat source to control the separation of the edges, said last mentioned control means including means interposed between said separated edges in advance of the heat source and adjustable means in advance of said interposed means and cooperating therewith and with the tube compressing means.

13. In welding apparatus for welding tube-form stock as it moves along a given path with the edges juxtaposed to form a cleft, a heat source for melting the edges, tube compressing means for moving the edges together as they are melted, thereby causing said melted edges to merge into each other at one point, and means disposed in advance of the heat source to control the separation of the edges, said last mentioned control means including a ribbed roll having its rib operating in said cleft and adjustable tube compressing means engaging the stock in advance of said ribbed roll.

ERNEST RIEMENSCHNEIDER.

CERTIFICATE OF CORRECTION.

Patent No. 1,948,801.   February 27, 1934.

ERNEST RIEMENSCHNEIDER.

It is hereby certified that the assignee in the above numbered patent was erroneously described and specified as "Midland Steel Products Company", whereas said assignee should have been described and specified as The Midland Steel Products Company, of Cleveland, Ohio, a corporation of Ohio; as shown by the records of assignments in this office; and that the said Letters Patent should be read with this correction therein that the same may conform to the record of the case in the Patent Office.

Signed and sealed this 19th day of June, A. D. 1934.

Bryan M. Battey (Seal)   Acting Commissioner of Patents.